(12) United States Patent
Kojima

(10) Patent No.: US 10,204,232 B2
(45) Date of Patent: Feb. 12, 2019

(54) APPARATUS CAPABLE OF EXECUTING ADJUSTING OPERATION, CONTROL METHOD FOR CONTROLLING ADJUSTING OPERATION OF APPARATUS, AND STORAGE MEDIUM

(71) Applicant: CANON KABUSHIKI KAISHA, Tokyo (JP)

(72) Inventor: Nobuyuki Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 731 days.

(21) Appl. No.: 13/956,947

(22) Filed: Aug. 1, 2013

(65) Prior Publication Data

US 2014/0047554 A1   Feb. 13, 2014

(30) Foreign Application Priority Data

Aug. 9, 2012 (JP) .................................. 2012-177532
Jul. 8, 2013 (JP) .................................. 2013-143096

(51) Int. Cl.
*G06F 21/62* (2013.01)
*G06Q 10/00* (2012.01)
(Continued)

(52) U.S. Cl.
CPC ............. *G06F 21/62* (2013.01); *G06Q 10/20* (2013.01); *G06F 21/10* (2013.01); *H04N 1/44* (2013.01)

(58) Field of Classification Search
CPC ... G06F 21/10; G06F 21/31; G11B 20/00086; H04L 63/08; G06Q 10/20
See application file for complete search history.

(56) References Cited

U.S. PATENT DOCUMENTS 6,792,561 B1 * 9/2004 Mamata .............. G06F 13/1689
714/36
9,239,974 B2 * 1/2016 Edamatsu .......... G06K 15/1805
(Continued)

FOREIGN PATENT DOCUMENTS

JP   H07-287688    10/1995
JP   2009200963 A   9/2009
(Continued)

OTHER PUBLICATIONS

Device, System and Program, Ryoji Matsumura, Mar. 6, 2012, JP 2012-049010.*
(Continued)

*Primary Examiner* — Hadi S Armouche
*Assistant Examiner* — Shaqueal D Wade
(74) *Attorney, Agent, or Firm* — Venable LLP

(57) ABSTRACT

The apparatus includes a management unit configured to manage an access right that is assigned to each of a plurality of users, and a storage unit configured to store a plurality of scenarios including the adjusting operation of the apparatus and a first access level that is assigned to each of the scenarios. Furthermore, the apparatus determines whether or not a scenario can be executed with the access right given to a user, by comparing the access right of the user with the first access level stored in the storage unit, and displays, before the scenario is executed, at least one of the plurality of scenarios on a display unit such that the determination result can be displayed identifiably.

5 Claims, 11 Drawing Sheets

(51) Int. Cl.
  *H04N 1/44* (2006.01)
  *G06F 21/10* (2013.01)

(56) References Cited

U.S. PATENT DOCUMENTS

| | | | | |
|---|---|---|---|---|
| 2004/0046984 | A1* | 3/2004 | Azami | H04N 1/0097 358/1.13 |
| 2005/0080897 | A1* | 4/2005 | Braun | H04L 41/0803 709/225 |
| 2005/0141020 | A1* | 6/2005 | Harano | G06K 15/005 358/1.15 |
| 2005/0225795 | A1* | 10/2005 | Nuggehalli | G06F 3/1205 358/1.15 |
| 2005/0271410 | A1* | 12/2005 | Namizuka | G06F 1/32 399/75 |
| 2009/0103937 | A1* | 4/2009 | Kudo | G03G 15/5016 399/80 |
| 2009/0213407 | A1 | 8/2009 | Kamiya | |
| 2009/0327945 | A1 | 12/2009 | Tomizawa | |
| 2010/0086317 | A1* | 4/2010 | Kadokura | G03G 15/55 399/11 |
| 2010/0293141 | A1* | 11/2010 | Anand | G06F 8/71 707/640 |
| 2012/0042362 | A1* | 2/2012 | Vlasov | G06F 21/604 726/4 |
| 2012/0154842 | A1 | 6/2012 | Hori | |
| 2013/0239179 | A1* | 9/2013 | Matsumura | H04N 1/00408 726/4 |

FOREIGN PATENT DOCUMENTS

| | | |
|---|---|---|
| JP | 2010009600 A | 1/2010 |
| JP | 2012134606 A | 7/2012 |

OTHER PUBLICATIONS

May 26, 2017, Japanese Official Action (with English translation) in Japanese Patent Appln. No. 2013-143096.

* cited by examiner

FIG. 9

| | | |
|---|---|---|
| SCENARIO BASIC INFORMATION | CATEGORY | 861 |
| | TITLE | 862 |
| | DESCRIPTIVE TEXT | 863 |
| | ID | 864 |
| | SCENARIO ACCESS LEVEL | 865 |
| ADJUSTMENT ITEM LIST | ITEM 1 | |
| | ITEM 2 | |
| | ... | |
| | ITEM m | |
| IMAGE DATA LIST | IMAGE DATA 1 | |
| | IMAGE DATA 2 | |
| | ... | |
| | IMAGE DATA n | |

850, 860, 870, 880

APPARATUS CAPABLE OF EXECUTING ADJUSTING OPERATION, CONTROL METHOD FOR CONTROLLING ADJUSTING OPERATION OF APPARATUS, AND STORAGE MEDIUM

BACKGROUND OF THE INVENTION

Field of the Invention

The present invention relates to an apparatus capable of executing an adjusting operation, a control method for controlling the adjusting operation of the apparatus, and a storage medium.

Description of the Related Art

In an image processing apparatus, a user interface (service mode) for service persons is prepared such that a service person can execute various kinds of adjustment and maintenance operations in the market. Items of the service mode are provided on menus that are layered for each characteristic of the items. Also, each item of the service mode is provided with an access level. A service person who has received a specialized education is given a high-level access right, and a general service person is given a normal access right. Accordingly, access to the items of the service mode is controlled in accordance with the access right assigned to each service person.

Multiple items need to be manipulated to correct a certain operation. Even for simple adjustment, initially, a sensor value is checked, an appropriate set value is changed, an adjusting operation is performed, and the operation is checked. Moreover, these processes are repeated until the normal operation is restored. Items for sensor check, items for set value change, and items for an adjusting operation instruction are often provided in different menu trees, and a service person has to go back and forth many times between menu layers, moving other screens in order to perform a series of operations. Also, an operating error such as use of a wrong item is likely to occur. For this reason, a user interface (hereinafter referred to as a situation mode) is provided in which a series of operations necessary for a specific adjust operation are managed as a single workflow and the items necessary for the operation are collectively displayed at one position such that these items can be accessed.

In the case where the access right that is set for any service mode items belonging to a certain workflow indicates that the item cannot be accessed with the access right of a service person who performs the operation, this service person cannot execute the workflow. Also, since the service management methods in the market depend on the companies that are in charge of service management, highly flexible access management by the companies in charge is necessary. For example, a configuration is required in which the operation is changed when it is preferred that specific failure handling can be executed even by a general service person and when it is preferred that specific failure handling is not allowed to be executed by simply any kind of service person. For example, in Japanese Patent Laid-Open No. 07-287688, when an operation is performed, an access right of an operator is dynamically changed at every stage of the operation, thereby enabling the operation belonging to the workflow to be executed.

However, the aforementioned conventional technique has the following problem. For example, in the aforementioned conventional technique, it is determined whether or not access is possible after actually arriving at each stage of the workflow, and therefore, operations that have already been done so far will count for nothing in some cases if it is determined that access is impossible at a stage after the workflow has been performed to some extent.

SUMMARY OF THE INVENTION

The present invention enables realization of a system in which a user can recognize whether or not a scenario can be executed before the scenario is executed, execution of a scenario that cannot be executed by the user is avoided, and a needless operation is prevented from occurring.

One aspect of the present invention provides an apparatus that is capable of executing an adjusting operation, comprising: a management unit configured to manage an access right that is assigned to each of a plurality of users; a storage unit configured to store a plurality of scenarios including the adjusting operation of the apparatus, and a first access level that is assigned to each of the scenarios; a determination unit configured to determine whether or not each of the plurality of scenarios can be executed with the access right given to a user who operates the apparatus, by comparing the access right of the user with the first access level stored in the storage unit, and a display control unit configured to display, before the scenario is executed, at least one of the plurality of scenarios on a display unit such that a result of determination performed by the determination unit can be displayed identifiably.

Another aspect of the present invention provides an apparatus that is capable of executing an adjusting operation, comprising: a management unit configured to manage an access right that is assigned to each of a plurality of users; a storage unit configured to store a plurality of scenarios including the adjusting operation of the apparatus, and a first access level that is assigned to each of the scenarios; a determination unit configured to determine whether or not each of the scenarios can be executed with the access right given to a user who operates the apparatus, by comparing the access right of the user with the first access level stored in the storage unit, and a display control unit configured to display the scenarios on a display unit, wherein if the scenario that is determined by the determination unit to be inexecutable with the access right of the user is selected by the user from among the plurality of scenarios, the display control unit performs warning which indicates that the selected scenario cannot be executed.

Still another aspect of the present invention provides a control method for controlling an adjusting operation of an apparatus, the apparatus having a management unit configured to manage an access right that is assigned to each of a plurality of users, and a storage unit configured to store a plurality of scenarios including the adjusting operation of the apparatus and a first access level that is assigned to each of the scenarios, the control method comprising determining whether or not each of the scenarios can be executed with the access right given to a user who uses the scenario, by comparing the access right of the user with the first access level stored in the storage unit, by a determination unit, and displaying, before the scenario is executed, at least one of the plurality of scenarios on a display unit such that a result of determination performed by the determination unit can be displayed identifiably, by a display control unit.

Yet still another aspect of the present invention provides a non-transitory computer-readable storage medium storing a computer program for causing a computer to execute each step of the control method.

Further features of the present invention will become apparent from the following description of exemplary embodiments (with reference to the attached drawings).

BRIEF DESCRIPTION OF THE DRAWINGS

FIG. 9 is a diagram showing a situation mode information data structure.

DESCRIPTION OF THE EMBODIMENTS

Figure 1:
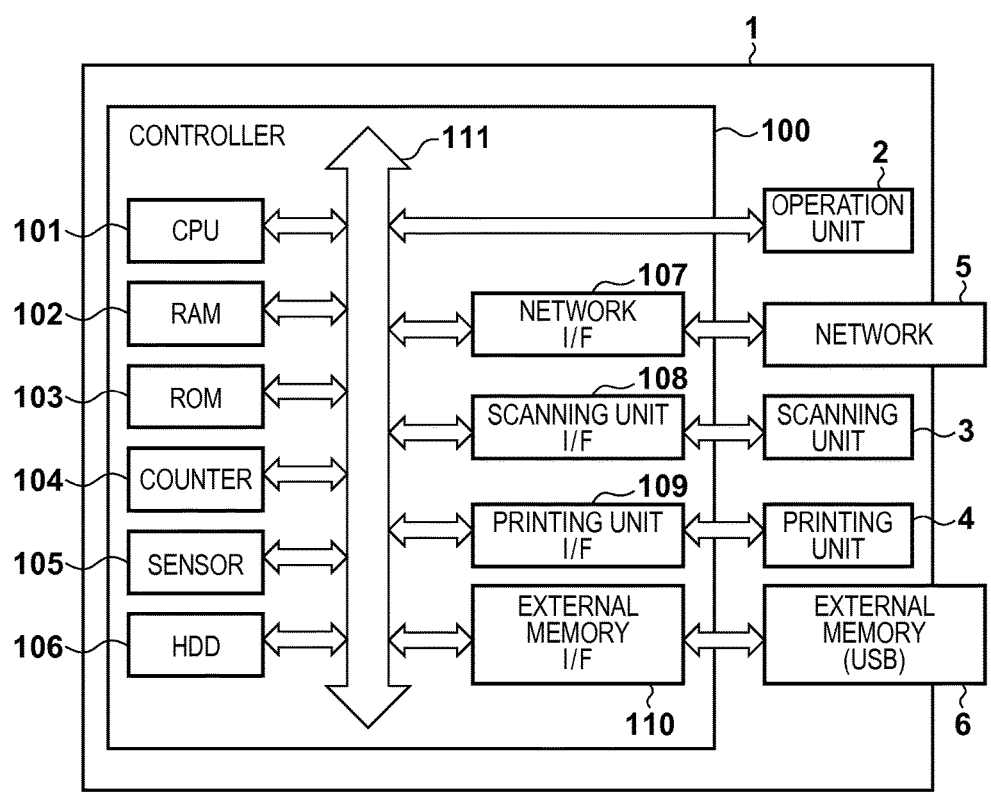
FIG. 1 is a diagram showing a configuration of a control system in an image processing apparatus according to an embodiment of the present invention.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Control System in Image Processing Apparatus

Hereinafter, an embodiment of the present invention will be described with reference to FIGS. 1 to 9. First, a configuration of a control system in an image processing apparatus 1 of the present embodiment will be described with reference to FIG. 1. The image processing apparatus 1 includes an operation unit 2, a scanning unit 3, a printing unit 4, and a controller 100, and is connected to a network 5 and an external memory 6 so as to be able to communicate therewith. Hereinafter, scenarios are directed to an image processing apparatus, but may also be directed to an apparatus that does not include the scanning unit 3 or the printing unit 4.

The operation unit 2 is provided with a liquid-crystal display unit having a touch panel function, a keyboard, and the like. Upon a user operating the operation unit 2, a signal is input to the controller 100. The scanning unit 3 scans an image on an original, generates an image signal, and transmits it to the controller 100. The printing unit 4 performs image formation on a recording medium, based on an input from the controller 100. The network 5 is connected to an external device such as a user terminal or a server. The external memory 6 is, for example, a USB memory or the like, and is able to exchange data with the controller 100.

The controller 100 includes a CPU 101, a RAM 102, a ROM 103, a counter 104, a sensor 105, and an HDD 106, and performs overall control of the image processing apparatus 1. Also, the controller 100 includes a network I/F 107, a scanning unit I/F 108, a printing unit I/F 109, and an external memory I/F 110 so as to exchange data or the like with the devices included in the image processing apparatus 1 and the external device. These constituent components included in the controller 100 are connected by a system bus 111 so as to be able to communicate with one another.

The CPU 101 performs various kinds of control such as outputting an image signal to the printing unit 4 and receiving an image signal from the scanning unit 3, based on a control program or the like stored in the ROM 103 or the HDD 106. The CPU 101 receives a signal from the counter 104, the sensor 105, or the like, in accordance with information necessary for various kinds of control.

The RAM 102 is used as a temporary storage area such as a main memory and a work area for the CPU 101. The ROM 103 stores programs or the like by which the CPU 101 performs various kinds of processing. The HDD 106 stores various kinds of data and files and various information tables, as well as programs or the like by which the CPU 101 performs various kinds of processing.

The counter 104 manages and stores an incremented value via a circuit (not shown) for measuring the number of operations. The sensor 105 detects a state of the apparatus, such as the temperature thereof, and transmits the detected information as a signal to the CPU 101 as needed, for the CPU 101 to execute various kinds of processing. The scanning unit 3 and the printing unit 4 also have a sensor and a counter, which are not shown in the diagram, and the CPU 101 is able to receive signals from these constituent components via the scanning unit I/F 108 and the printing unit I/F 109.

Module Configuration for Various Kinds of Processing

Figure 2:
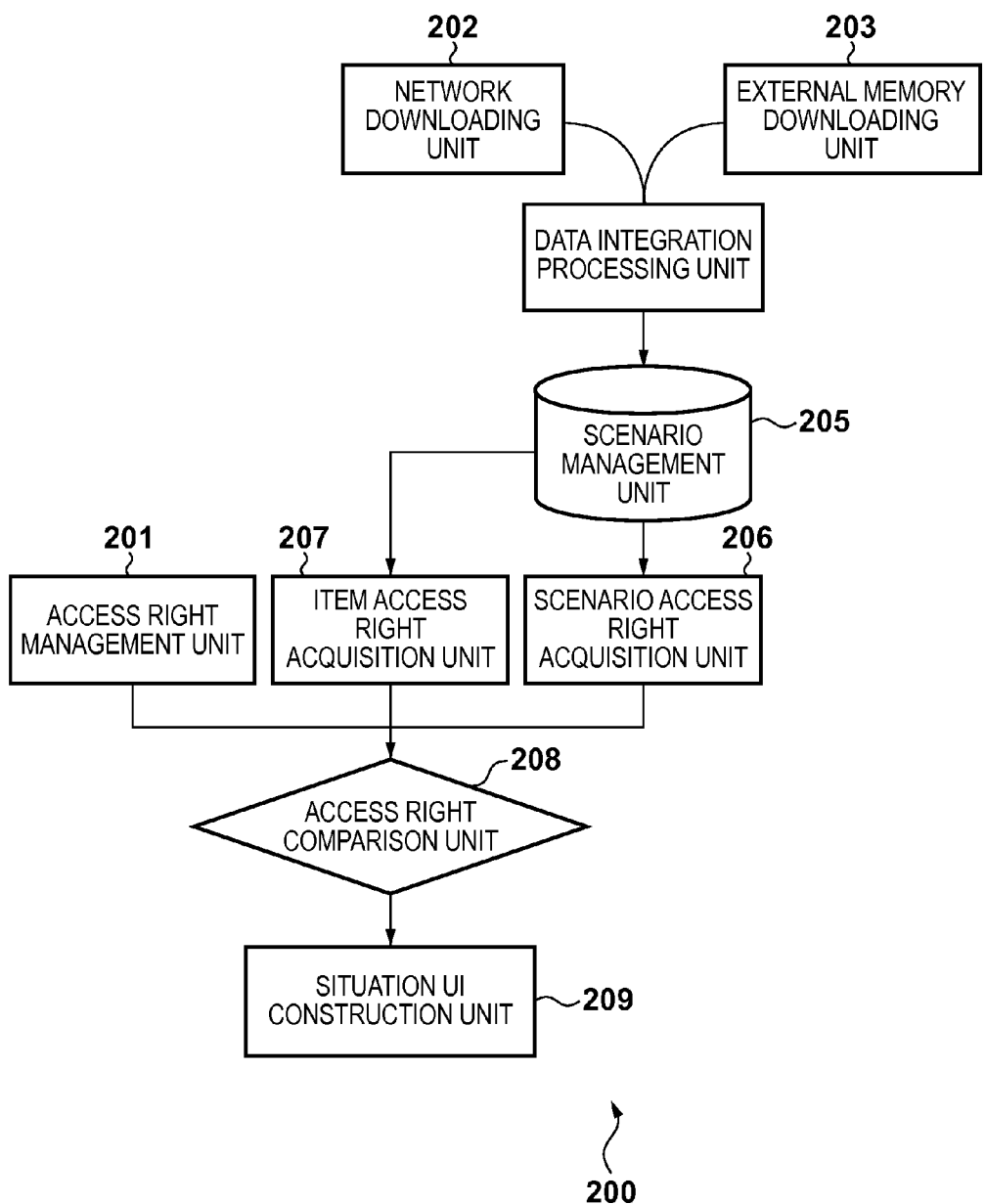
FIG. 2 is a diagram showing a configuration of modules for various kinds of processing performed in the image processing apparatus.

Next, a module configuration for various kinds of processing performed in the image processing apparatus 1 will be described with reference to FIG. 2. An access right management unit 201 manages IDs and passwords that are assigned to users, and determines whether or not an ID and a password that are input by a user via the operation unit 2 match those managed by the access right management unit 201.

A network downloading unit 202 can download data from the network 5 via the network I/F 107. An external memory downloading unit 203 can download data from the external memory 6 via the external memory I/F 110. A data integration processing unit 204 performs updates, such as rewriting and adding, of scenario information downloaded by the network downloading unit 202 or by the external memory downloading unit 203.

Figure 8:
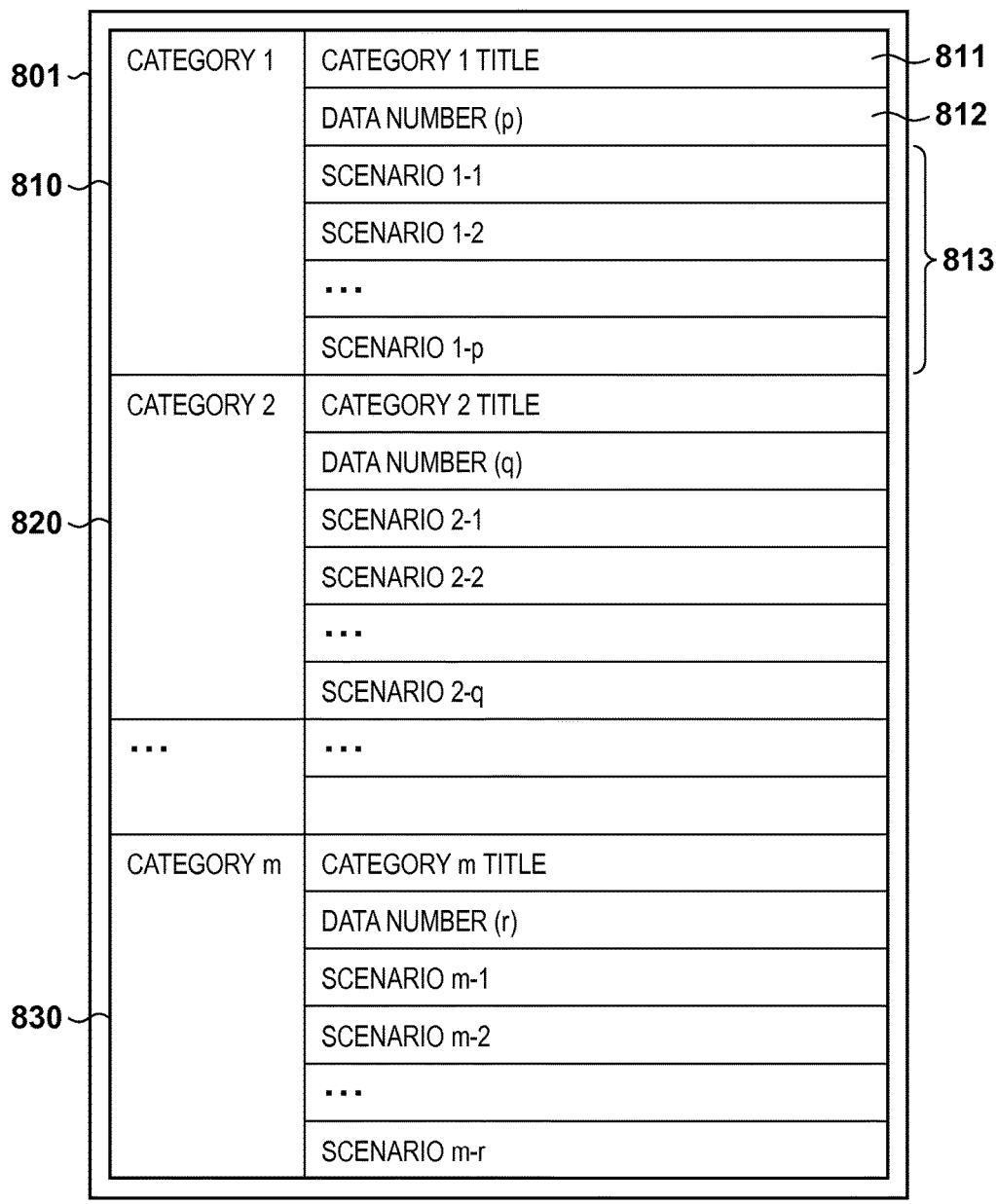
FIG. 8 is a scenario access right check flowchart.

A scenario management unit 205 manages a situation information file 801 (which will be described later with reference to FIGS. 8 and 9). A scenario access right acquisition unit 206 acquires a scenario access level 865 (first access level, which will be described later with reference to FIG. 9) from the situation information file 801 managed by the scenario management unit 205. An item access right acquisition unit 207 acquires the highest access level from among access levels that are set for adjustment items used in a scenario, from the situation information file 801 managed by the scenario management unit 205. The access right comparison unit 208 compares an access level that is managed by the access right management unit 201 and assigned to a user, with the scenario access level 865 acquired by the scenario access right acquisition unit 206, or with the item access level acquired by the item access right acquisition unit 207. Thus, the access right comparison unit 208 determines whether or not the user can access the scenario.

A situation UI construction unit 209 (situation user interface construction unit) displays scenarios belonging to a selected situation (which will be described later) in a scenario selection screen 503, which will be described later with reference to FIG. 5. Also, in accordance with the access right (access level) of the user, the situation UI construction unit 209 determines whether or not a selected scenario can be executed in conformity to the determination performed by the access right comparison unit 208.

Processing Procedure

Figure 3:
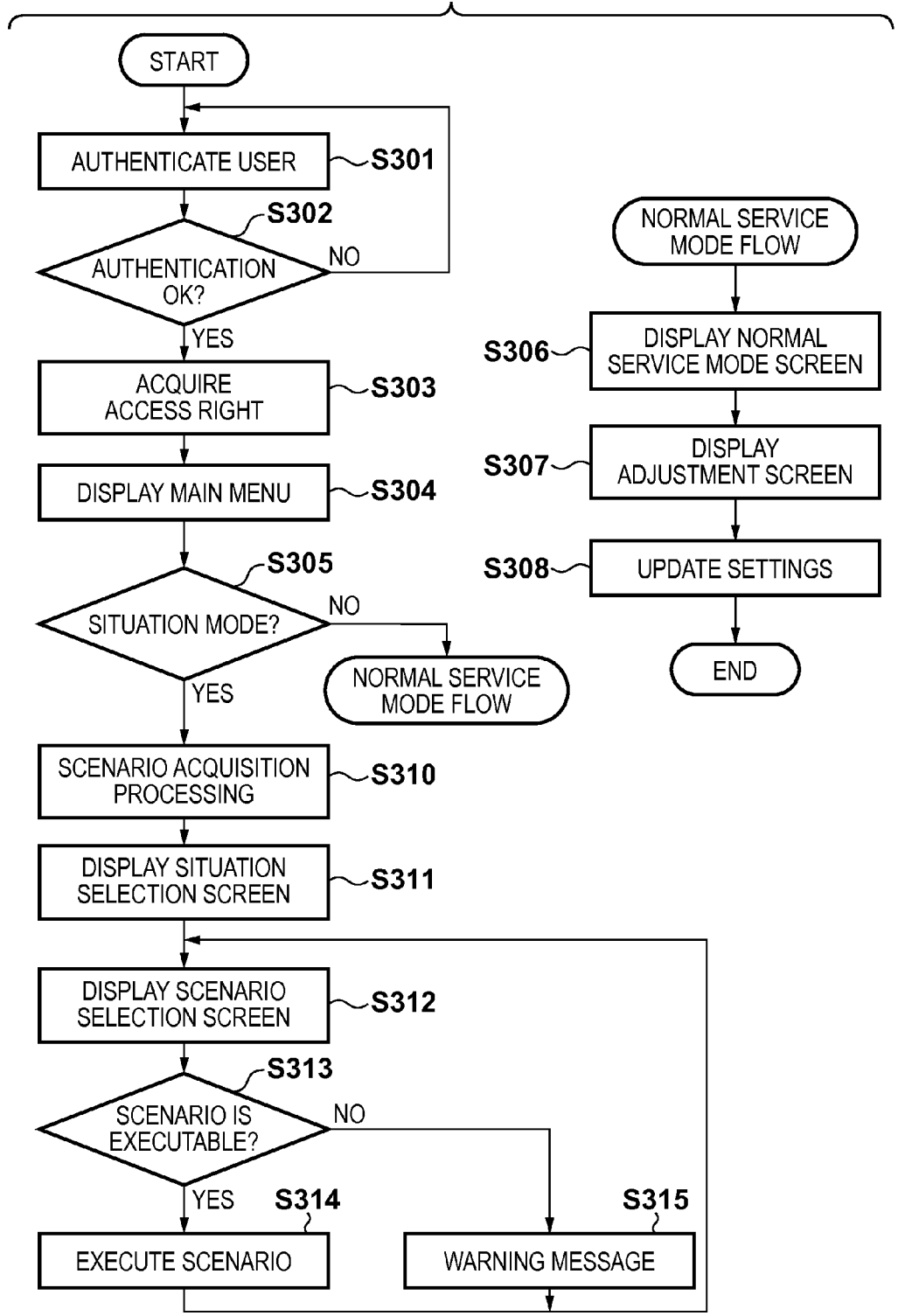
FIG. 3 is a service person authentication screen.

Hereinafter, processing according to the present embodiment using the module configuration shown in FIG. 2 will be described with reference to FIG. 3. Note that processing performed by the image processing apparatus 1 described below is realized by the CPU 101 loading a control program stored in the ROM 103 or the HDD 106 into the RAM 102 and executing it. Note that in the case where the operation unit 2 displays a screen, the CPU 101 controls the operation unit 2 for displaying the screen. First, a user (service person) performs a predetermine operation, and the user interface thereby transitions from a normal mode to a service mode.

Figure 4:
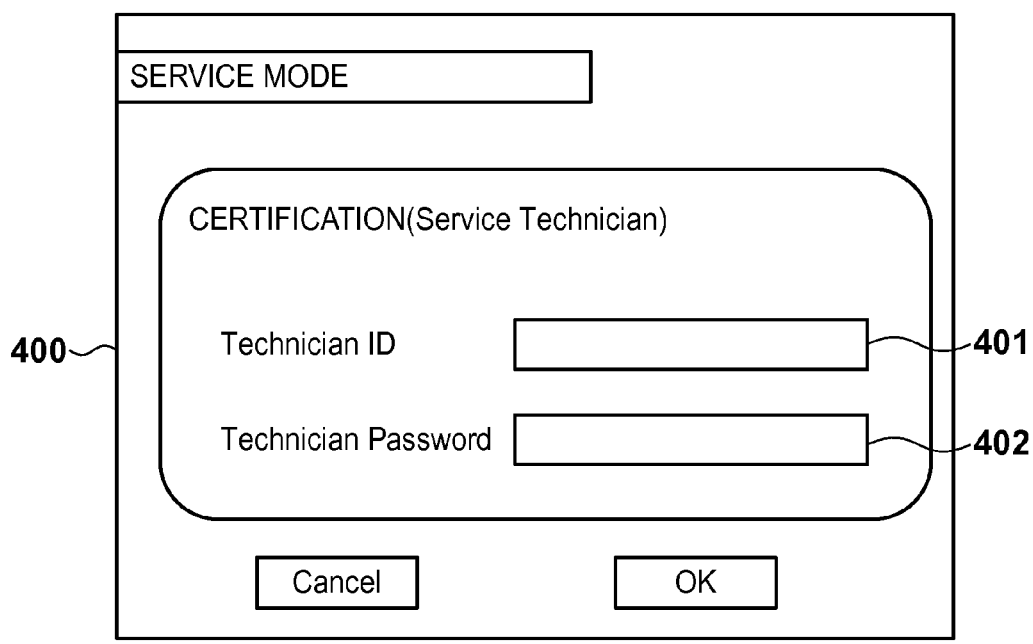
FIG. 4 is a situation mode screen transition diagram.

After the transition to the service mode, in step S301, the liquid-crystal display unit of the operation unit 2 displays a service mode authentication screen 400 shown in FIG. 4. In the authentication screen 400, an ID input portion 401 and a password input portion 402 are displayed. The user inputs a unique ID and password, which are assigned to each user, in the respective input portions. In step S302, the access right management unit 201 receives the authentication information that was input in the ID input portion 401 and the password input portion 402, and executes authentication. If the authentication is successful, in step S303, the access right management unit 201 acquires a value (access level: e.g., a value of 1 to 3) indicating a preset access right that corresponds to the authentication information of the user.

Figure 5:
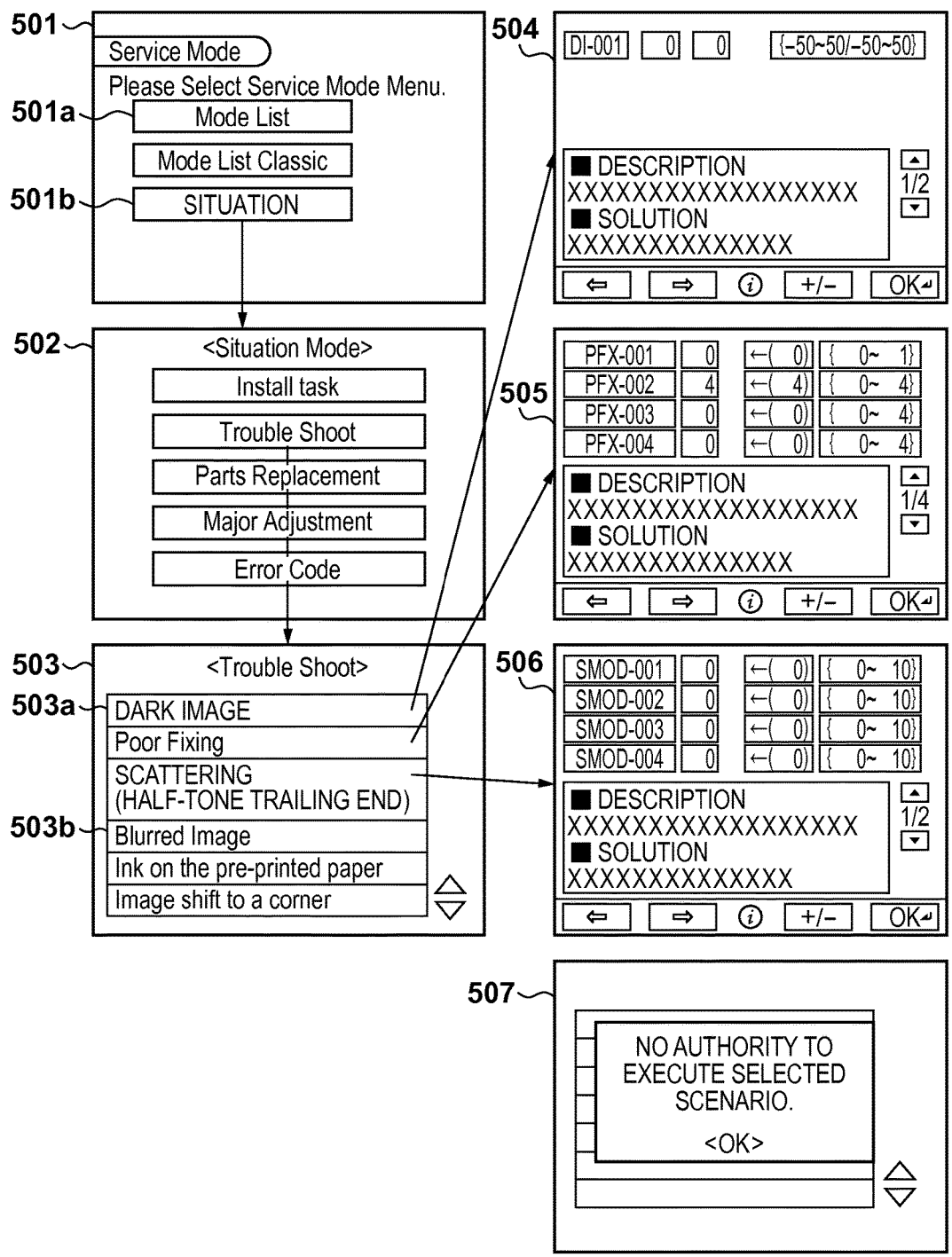
FIG. 5 shows screen specifications in the case of access level violation.
Figure 6:
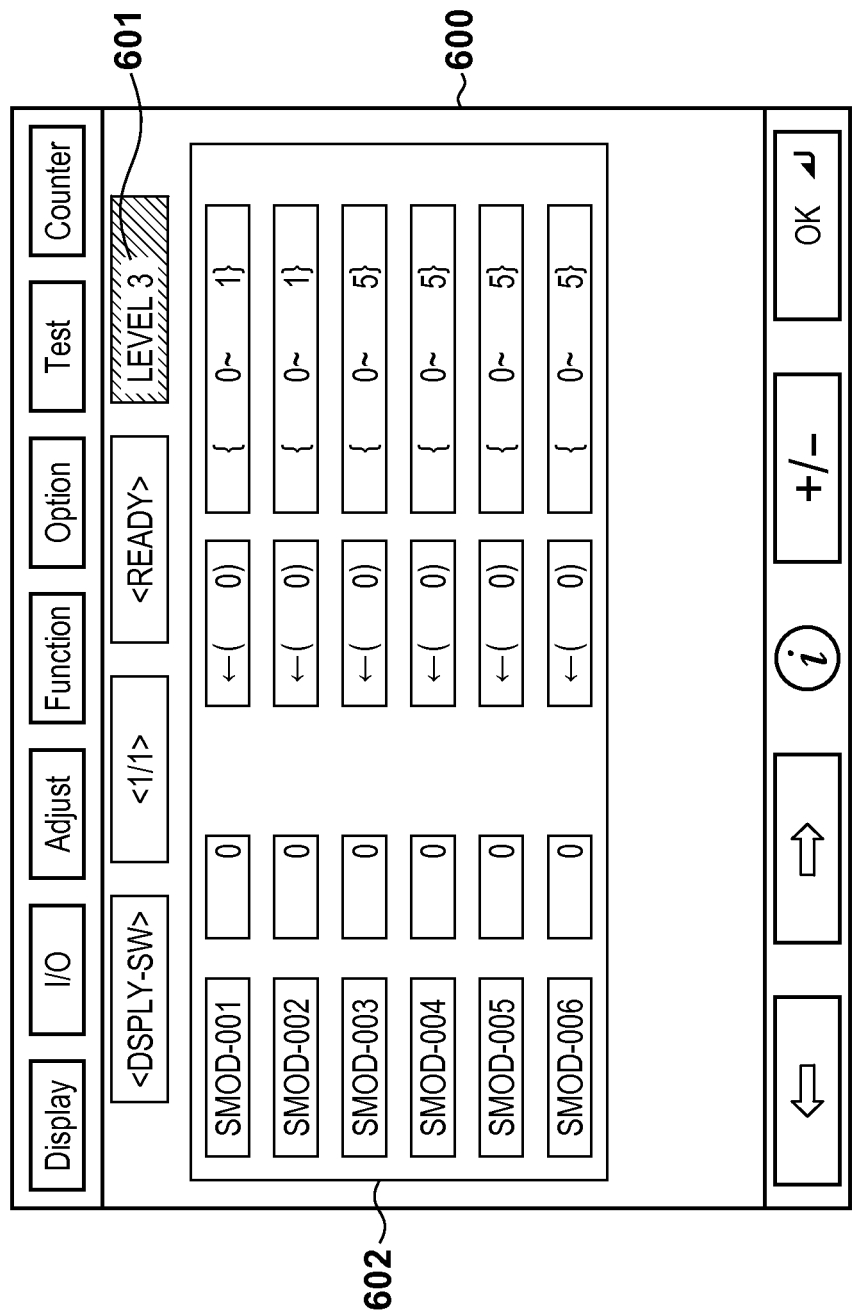
FIG. 6 is a display of an access right in a normal service mode.

Next, in step S304, the liquid-crystal display unit of the operation unit 2 displays a main menu screen 501 shown in FIG. 5. A menu for selecting multiple service mode functions, such as a "MODE LIST" button 501*a*, a "SITUATION" button 501*b*, and the like is displayed in the main menu screen 501. Here, the user presses any of the buttons displayed in the main menu screen 501. Subsequently, in step S305, the controller 100 determines whether or not the pressed button is the "SITUATION" button 501*b*. If it is determined that the "MODE LIST" button 501*a* was pressed (No in step S305), the controller 100 determines that the normal mode is selected, and processing proceeds to step S306. On the other hand, if it is determined that the "SITUATION" button 501*b* was pressed (Yes in step S305), the controller 100 determines that the situation mode is selected, and processing proceeds to step S310.

Processing in Normal Mode

In step S306, the controller 100 causes the operation unit 2 to display a normal service mode screen (not shown). Upon a user performing a predetermined operation, in step S307, an adjustment screen 600 shown in FIG. 6, in which a plurality of items are listed, is displayed on the operation unit 2. A LEVEL button 601 and an adjustment portion 602 are displayed in the adjustment screen 600. The LEVEL button 601 is a button by which a user sets the access level, and every time the button is pressed, the value of the access level is cyclically changed from "level 1" to "level 2", to "level 3", and then to "level 1". Various adjustment items are displayed in the adjustment portion 602, and the user can check an adjustment value, set an adjustment value, give various adjusting operation instructions, check a value of a counter for measuring the degree of wearing of components, and the like by selecting any of these items. Here, some of the adjustment items significantly affect the operation of the image processing apparatus 1, and a reduction in recording quality or the like may possibly occur if a user who does not have sufficient knowledge operates such items. For this reason, items that correspond to the access level of each user are displayed in the adjustment portion 602. A description will be given below for a display in the adjustment unit 602 with respect to an operation on the LEVEL button 601.

The controller 100, upon detecting an operation input from the LEVEL button, compares the access level that is currently displayed in the adjustment screen 600 with the access level that is assigned to the user and acquired in step S303. If the access level in the adjustment screen 600 is lower than the access level assigned to the user, the controller 100 causes the adjustment portion 602 to display items that correspond to the access level in the adjustment screen 600. On the other hand, if the access level in the adjustment screen 600 is higher than the access level assigned to the user, the controller 100 does not cause the adjustment portion 602 of this access level to display the adjustment items, but issues a notification or the like indicating that adjustment cannot be performed with the access level of this user, for example. After the items that can be adjusted using the assigned access right are adjusted, in step S308, the controller 100 updates settings of the image processing apparatus 1 and ends the normal mode.

Processing in Situation Mode

First, in step S310, a scenario (workflow) that can be executed by the user is acquired. The details of scenario acquisition processing will be described later. In step S311, a situation selection screen 502 (FIG. 5) is displayed on the operation unit 2. Buttons for transitioning to different situations are displayed in the situation selection screen 502. Here, a "situation" indicates an adjusting operation related to maintenance of the image processing apparatus 1, and indicates an outline of processing executed by the user. For example, the situations include an installation task for installing software in the image processing apparatus 1 and troubleshooting for resolving a problem that occurs in the image processing apparatus 1.

Upon the user pressing any of the buttons displayed in the situation selection screen 502, in step S312, the situation UI construction unit 209 causes the operation unit 2 to display the scenario selection screen 503. In the scenario selection screen 503, buttons indicating scenarios that belong to a situation are displayed. Here, a "scenario" indicates an adjusting operation included in each situation, and for example, a plurality of items (scenarios) for resolving troubles, such as scattering, are displayed in a selectable manner in the scenario selection screen 503 shown in FIG. 5. In step S312, buttons 503*a* indicating executable scenarios acquired in step S310 are displayed. Meanwhile, scenarios that cannot be executed by the user can be displayed with shading, displayed in a different color, or displayed in another form so as to notify the user that these scenarios cannot be executed. In the present embodiment, as shown in the scenario selection screen 503, buttons 503*b* indicating inexecutable scenarios are displayed with shading in an unselectable manner. In other words, in step S312, the situation UI construction unit 209 determines whether or not a target scenario can be executed with the access right given to the user, by comparing the access right of the user authenticated in step S301 with the access level of this scenario (first access level). Furthermore, the situation UI construction unit 209 displays the result of this determination in an identifiable manner before the scenario is executed. Note that the scenario selection screen 503 shown in FIG. 5 is an example (Troubleshooting mode), and if the other situation mode is selected in the situation selection screen 502, a different menu is displayed accordingly.

Upon the user selecting any of the scenarios shown in the scenario selection screen 503, in step S313, the situation UI construction unit 209 determines whether or not the selected scenario can be executed. If it is determined that the selected scenario can be executed (Yes in step S313), in step S314, execution of the scenario starts, and adjustment items included in the selected scenario are displayed (reference numerals 504, 505, and 506 in FIG. 5 denote exemplary displays). The user adjusts or checks the displayed adjustment items, and thereafter, the scenario selection screen 503 is displayed again on the operation unit 2. On the other hand, if the selected scenario cannot be executed (No in step S313), in step S315, a warning screen 507 is displayed. At this time, in the case where the image processing apparatus 1 includes a sound generation unit such as a buzzer, warning sound may be output in place of, or in addition to, the display of the warning screen 507. Upon the user touching any point on the operation unit 2, the scenario selection screen 503 is displayed again on the operation unit 2. In step S312, inexecutable scenarios are displayed with shading or in a different color, and the user can thereby recognize whether or not scenarios can be executed at an earlier stage. However, in step S312, both executable scenarios and inexecutable scenarios may be displayed in the same manner. Even in this case, it is determined in step S313 whether or not the selected scenario can be executed, and a warning is given in step S315 if the selected scenario cannot be executed, and the user can thereby recognize that this scenario cannot be executed. Also, in step S312, inexecutable scenarios may be configured not to be displayed in the screen. In this case, inexecutable scenarios are never selected, and it is therefore possible to omit the determination in step S313. With the above-described configuration, the user is notified, before starting execution of a scenario, of the result of the determination of whether or not the scenario can be executed, and it is possible to avoid needless operations, as in the case where an inexecutable scenario is performed partway.

Scenario Acquisition Processing

Next, a description will be given for a configuration of the situation information file 801 used in the scenario acquisition processing in step S310, with reference to FIGS. 8 and 9. As shown in FIG. 8, the situation information file 801 is constituted by a plurality of categories, such as category 1 (810), category 2 (820), and category m (830), and is managed by the scenario management unit 205. Each category is constituted by a category title 811, a scenario number 812 indicating the number of scenarios included in the category, and a scenario list 813 indicating the scenarios included in the category. Each category corresponds to a menu displayed in the situation selection screen 502, and the category title is a display label in the menu. In other words, the situation information file 801 is a collection of a plurality of scenarios.

As shown in FIG. 9, each scenario 850 is constituted by scenario basic information 860, an adjustment item list 870, and an image data list 880. The scenario basic information 860 is constituted by scenario category information 861, a scenario title 862, descriptive text 863 that is displayed in the scenario, identification information (hereinafter, "ID 864") assigned to the scenario, and a scenario access level 865.

Also, the adjustment item list 870 includes adjustment items used in the scenario 850, and an item access level (second access level) is set for each adjustment item. The image data list 880 includes data of an image to be displayed on the operation unit 2 in the scenario 850. Note that the situation information file 801 are provided with latest scenarios at the time of shipping from the factory, but scenarios may possibly be added or modified after the shipping.

Figure 7:
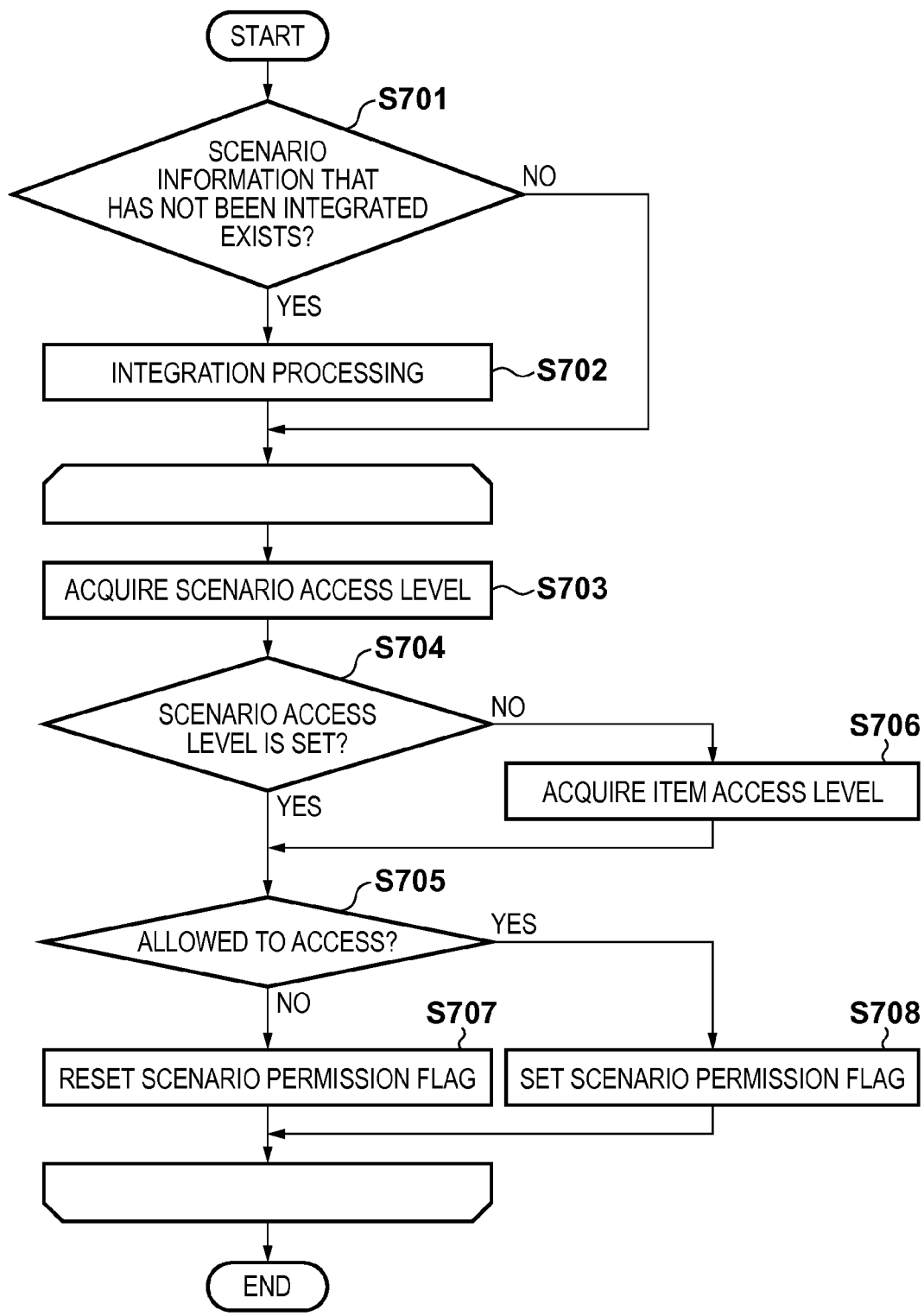
FIG. 7 is an overall flowchart.

Next, a description will be given, with reference to FIG. 7, for the details of the scenario acquisition processing in step S310 using the situation information file 801 described with reference to FIGS. 8 and 9. Note that processing performed by the image processing apparatus 1, which will be described below, is realized by the CPU 101 loading a control program stored in the ROM 103 or the HDD 106 into the RAM 102 and executing it.

In step S701, the data integration processing unit 204 determines whether or not scenario information that has been downloaded but has not been integrated exists in the situation information file 801. If unintegrated scenario information does not exist (No in step S701), processing proceeds to step S703. If unintegrated scenario information exists (Yes in step S701), in step S702, the data integration processing unit 204 performs processing for integration with the situation information file 801, using the ID 864 and the category information 861 contained in the unintegrated scenario data. In other words, if the situation information file 801 includes the same scenario as the scenario having the ID 864 in the scenario information that is downloaded at a later time, the old scenario is erased and replaced with the new scenario information having the same ID 864. If the same scenario as the scenario having the ID 864 in the downloaded scenario information does not exist, the downloaded scenario is added to the category corresponding to the category information 861.

Next, the following processes shown in steps S703 to S708 are repeated for all scenarios included in the integrated situation information file. In step S703, the scenario access right acquisition unit 206 acquires the scenario access level 865. The scenario access level 865 is optional information that is set by sales companies in various countries, and level setting information does not exist in some cases.

In step S704, it is determined whether or not the scenario access level 865 is set for the target scenario. If the scenario access level 865 is set, in step S705, the access right comparison unit 208 compares the scenario access level 865 with the access level of the user acquired in step S303, and determines whether or not the user can access the scenario. For example, if the access level of the user is the same as, or higher than, the value of the scenario access level 865, the user can access the scenario. If it is determined that the user can access the scenario (Yes in step S705), processing proceeds to step S708, and a permission flag for the scenario is set.

On the other hand, if it is determined that the user cannot access the scenario (No in step S705), in step S707, the permission flag for the scenario is reset. On the other hand, if the scenario access level 865 is not set for the target scenario in step S704, processing proceeds to step S706. In step S706, the item access right acquisition unit 207 acquires the highest item access level among the item access levels that are set for the adjustment items used in the scenario. Then, in step S705, the access right comparison unit 208 compares the item access level acquired in step S706 with the access level of the user acquired in step S303, and determines whether or not the user can access the scenario. If it is determined that the user can access the scenario (Yes in step S705), processing proceeds to step S708, and the permission flag for the scenario is set. On the other hand, if it is determined that the user cannot access the scenario (No in step S705), in step S707, the permission flag for the scenario is reset. As a result of this, in the scenario selection screen in step S312, a scenario for which the permission flag is set is displayed in a selectable manner, and a scenario for which the permission flag is reset is displayed in an unselectable manner.

As described above, according to the present embodiment, the user can recognize whether or not the scenario can be executed before executing the scenario, and it is therefore possible to prevent a needless operations caused by performing an inexecutable scenario partway.

Note that recently there has been increased customer demand for a higher level of security, and there is demand to be able to prevent service persons from modifying specific items even if these items are service mode items. The "specific items" refer to items related to resources of a customer company, such as settings items related to the network environment of the customer company and items for executing initialization that cause user information to be erased due to initialization of a storage area within a device. Here, a description will be given for a suppression function of suppressing modification of a specific item by a service person.

Figure 10:
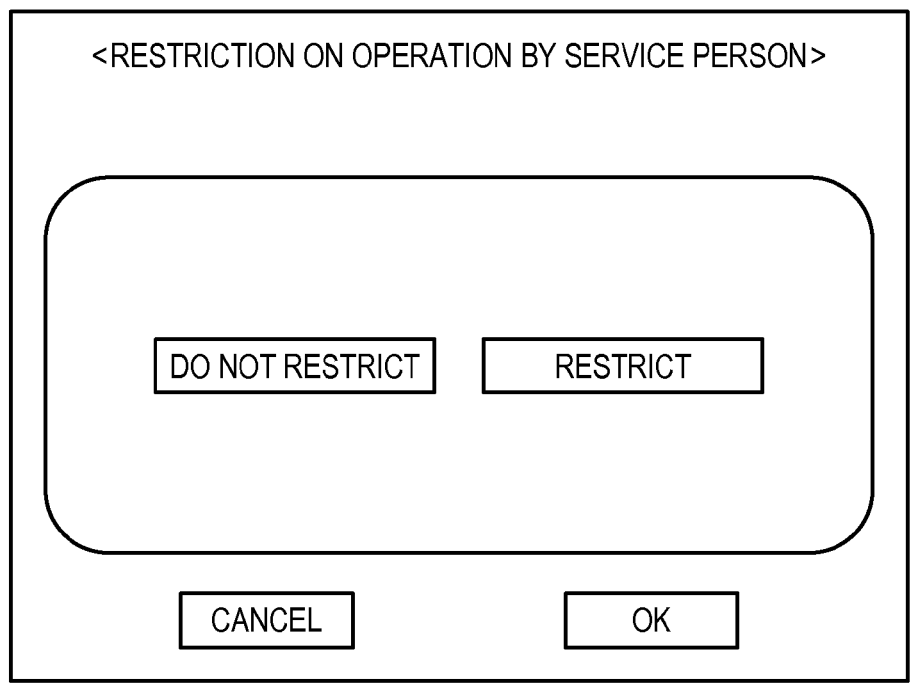
FIG. 10 is a restriction screen indicating restriction on operation by a service person in charge.

FIG. 10 is a setting screen for setting restriction on operations performed by a service person. The screen in FIG. 10 is a screen that can be read out by an administrator at a customer company when necessary. When the screen in FIG. 10 is read out, an input of an administrator password is required, and control is performed such that a general user other than the administrator cannot configure settings.

If "restrict" is set in the screen in FIG. 10, access to a specific item by a service person is restricted. In this case, when a service person accesses the aforementioned specific item from the normal service mode, the service person can check a current set value, but cannot change the value. For example, in the case of an item for execution of initialization, the item is displayed but cannot be operated. Note that if a service person wants to change the set value of the target item or to perform initialization, he/she needs to have the administrator on the customer side cancel the operation restriction. On the other hand, if "do not restrict" is set in the screen in FIG. 10, no special restriction regarding the specific item is performed, and only the restriction based on the access level of the service person, which was described in steps S306 to S308, is performed.

On the other hand, in the case of the situation mode, if restriction is set on operations by a service person, control is performed such that a scenario including the specific item is displayed in an unselectable manner. Processing performed by the image processing apparatus 1 in this case will now be described.

Figure 11:
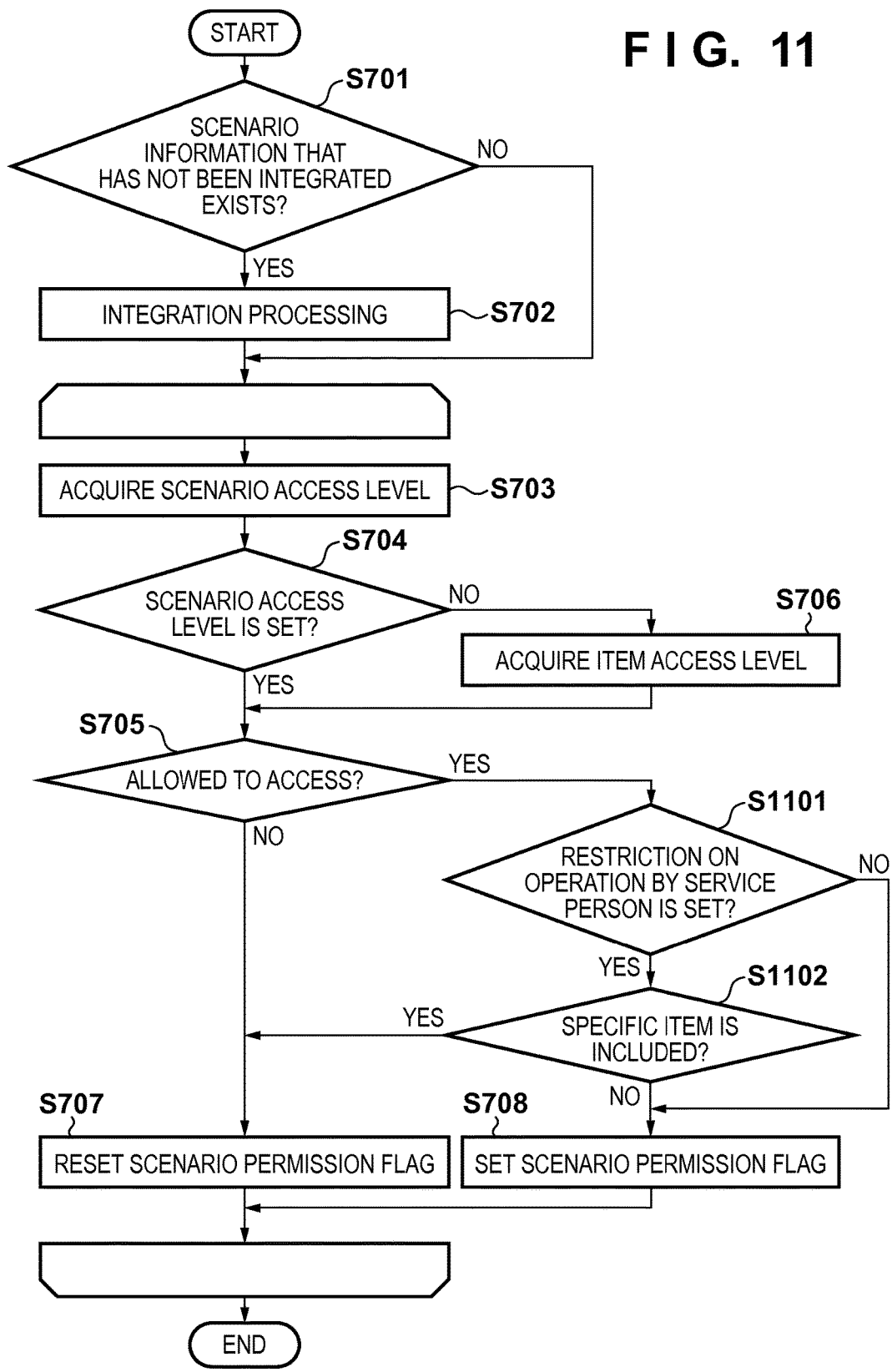
FIG. 11 is an overall flowchart.

FIG. 11 is a diagram illustrating the scenario acquisition processing S310. Processes similar to those in FIG. 7 are given the same reference numerals, and the detailed description thereof will be omitted.

If it is determined in step S705 that the scenario can be accessed, in step S1101, it is determined whether or not restriction on operations by the service person is set to "restrict". If it is set to "do not restrict" (No in step S1101), processing proceeds to step S708, and the permission flag for the scenario is set.

On the other hand, if it is set to "restrict" (Yes in step S1101), in step S1102, it is determined whether or not a specific item is included in the target scenario. If it is determined that the specific item is included (Yes in step S1102), processing proceeds to step S707, and the permission flag for the scenario is reset. If it is determined that the specific item is not included (No in step S1102), processing proceeds to step S708, and the permission flag for the scenario is set. As a result of this, in the scenario selection screen in step S312, a service person cannot select the scenario including the specific item even though access thereto is possible based on the access level of the service person. Note that in the scenario selection screen, a message such as "Have the administrator at the customer company cancel operation restriction" may be displayed to prompt the service person for a procedure of cancelling the operation restriction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-177532 filed on Aug. 9, 2012 and 2013-143096 filed on Jul. 8, 2013, which are hereby incorporated by reference herein in their entirety.

What is claimed is:
1. An image forming apparatus comprising:
a memory device that stores a set of instructions; and
a processor that executes instructions, of the set of instructions, of:
(a) managing an access right that is assigned to each of a plurality of users;
(b) storing, in the memory device, an access level which is assigned to each set of adjusting user interfaces, the access level indicating an access level of each of a plurality of adjustment items included in the set of adjusting user interfaces;
(c) authenticating a user;
(d) displaying a first screen that displays selection user interfaces for selecting, by the authenticated user, a type of situation related to maintenance of the image forming apparatus and a type of trouble to be solved;
(e) determining, in accordance with selections of the type of situation and the type of trouble via the selection user interfaces by the authenticated user, whether or not the authenticated user has a predetermined access right for adjusting predetermined setting information of the image forming apparatus to solve the selected type of trouble;
(f) performing screen transition from the first screen to a second screen that displays a set of adjusting user interfaces to adjust the predetermined setting information, in a case where it is determined that the authenticated user has the predetermined access right; and
(g) restricting performing screen transition from the first screen to the second screen in a case where it is determined that the authenticated user does not have the predetermined access right, wherein, in the determining, it is determined whether or not the authenticated user has an authority to use the set of adjusting user interfaces for solving the selected type of trouble based on the access right of the authenticated user and the access level of the set of adjusting user interfaces corresponding to the predetermined setting information, and wherein the screen transition to the second screen is performed when it is determined that the authenticated user has the authority to use the set of adjusting user interface for solving the selected type of trouble.

2. The image forming apparatus according to claim 1, wherein the processor further executes instructions, in the memory device, of:

performing screen transition from the first screen to a warning screen which indicates that the authenticated user does not have the predetermined access right, in a case where it is determined that the authenticated user does not have the predetermined access right.

3. The image forming apparatus according to claim 1, wherein the processor further executes instructions, in the memory device, of:

displaying a menu screen for selecting one of a first mode and a second mode, wherein, in response to a selection of the first mode by the authenticated user, the first screen is displayed; and displaying, in response to a selection of the second mode by the authenticated user, a service mode screen for displaying an adjusting user interface corresponding to the access level based on the access right of the authenticated user.

4. A control method for controlling an image forming apparatus, the control method comprising:

managing an access right that is assigned to each of a plurality of users;

storing an access level which is assigned to each set of adjusting user interfaces, the access level indicating an access level of each of a plurality of adjustment items included in the set of adjusting user interfaces;

authenticating a user;

displaying a first screen that displays selection user interfaces for selecting, by the authenticated user, a type of situation related to maintenance of the image forming apparatus and a type of a trouble to be solved;

determining, in accordance with selections of the type of situation and the type of trouble via the selection user interface by the authenticated user, whether or not the authenticated user has a predetermined access right;

performing screen transition, from the first screen to a second screen that displays a set of adjusting user interfaces to adjust predetermined setting information, in a case where it is determined that the authenticated user has the predetermined access right; and restricting performing screen transition from the first screen to the second screen in a case where it is determined that the authenticated user does not have the predetermined access right, wherein, in the determining, it is determined whether or not the authenticated user has an authority to use the set of adjusting user interfaces for solving the selected type of trouble based on the access right of the authenticated user and the access level of the set of adjusting user interfaces corresponding to the predetermined setting information, and wherein the screen transition to the second screen is performed when it is determined that the authenticated user has the authority to use the set of adjusting user interface for solving the selected type of trouble.

5. A non-transitory computer-readable storage medium storing a computer program for causing a computer to execute steps of:

managing an access right that is assigned to each of a plurality of users;

storing an access level which is assigned to each set of adjusting user interfaces, the access level indicating an access level of each of a plurality of adjustment items included in the set of adjusting user interfaces;

authenticating a user;

displaying a first screen that displays selection user interfaces for selecting, by the authenticated user, a type of situation related to maintenance of the image forming apparatus and a type of a trouble to be solved;

determining, in accordance with selections of the type of situation and the type of trouble via the selection user interface by the authenticated user, whether or not the authenticated user has a predetermined access right;

performing screen transition, from the first screen to a second screen that displays a set of adjusting user interfaces to adjust predetermined setting information-, in a case where it is determined that the authenticated user has the predetermined access right-; and restricting performing screen transition from the first screen to the second screen in a case where it is determined that the authenticated user does not have the predetermined access right, wherein, in the determining, it is determined whether or not the authenticated user has an authority to use the set of adjusting user interfaces for solving the selected type of trouble based on the access right of the authenticated user and the access level of the set of adjusting user interfaces corresponding to the predetermined setting information, and wherein the screen transition to the second screen is performed when it is determined that the authenticated user has the authority to use the set of adjusting user interface for solving the selected type of trouble.

* * * * *